(12) United States Patent
Chen et al.

(10) Patent No.: US 7,793,140 B2
(45) Date of Patent: Sep. 7, 2010

(54) METHOD AND SYSTEM FOR HANDLING FAILOVER IN A DISTRIBUTED ENVIRONMENT THAT USES SESSION AFFINITY

(75) Inventors: Benson Kwuan-Yi Chen, Durham, NC (US); Michael A. Gilfix, Austin, TX (US); Mark David Gilmore, Durham, NC (US); Victor S. Moore, Lake City, FL (US); Ofira Tal-Aviv, Moshav Bitzaron (IL); Anthony William Wrobel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/872,235

(22) Filed: Oct. 15, 2007

(65) Prior Publication Data

US 2009/0100289 A1    Apr. 16, 2009

(51) Int. Cl.
*G06F 11/00* (2006.01)
(52) U.S. Cl. ............................................ 714/4; 714/15
(58) Field of Classification Search .................. 714/15, 714/57, 1, 2, 25, 42
See application file for complete search history.

(56) References Cited

U.S. PATENT DOCUMENTS

| 6,298,455 | B1 * | 10/2001 | Knapman et al. ............. 714/43 |
| 6,581,088 | B1 | 6/2003 | Jacobs et al. |
| 6,742,136 | B2 * | 5/2004 | Christensen et al. ........... 714/5 |
| 6,928,457 | B2 | 8/2005 | Jacobs et al. |
| 6,941,555 | B2 | 9/2005 | Jacobs et al. |
| 7,107,497 | B2 * | 9/2006 | McGuire et al. .............. 714/48 |
| 2004/0268357 | A1 | 12/2004 | Joy et al. |
| 2005/0223278 | A1 * | 10/2005 | Saika .......................... 714/15 |

(Continued)

FOREIGN PATENT DOCUMENTS

JP    2004206695 A    7/2004

OTHER PUBLICATIONS

Nejdl et al., "Super-Peer-Based Routing and Clustering Strategies for RDF-Based Peer-to-Peer Networks", Proceedings of the 12th international conference on World Wide Web, May 2003, Budapest, Hungary, pp. 536-543.

(Continued)

*Primary Examiner*—Scott T Baderman
*Assistant Examiner*—Sarai Butler
(74) *Attorney, Agent, or Firm*—Yee & Associates, P.C.; David A. Mims, Jr.

(57) ABSTRACT

A system for managing failover in a server cluster. In response to detecting a failed server, subscription message processing of a failover server is stopped. A subscription queue of the failed server is opened. A marker message is published to all subscribers of a particular messaging topic. The marker message includes an identification of the failover server managing the subscription queue of the failed server. Messages within the subscription queue of the failed server are processed. In response to determining that a message in the subscription queue of the failed server is the marker message, the subscription queue of the failed server is closed. Then, the failover server resumes processing of its original subscription queue looking for the marker message, while processing yet unseen messages from the queue. Once the marker message is found in the original subscription queue, normal operation is resumed.

17 Claims, 3 Drawing Sheets

U.S. PATENT DOCUMENTS

| | | | |
|---|---|---|---|
| 2005/0268146 A1* | 12/2005 | Jin et al. | 714/2 |
| 2006/0026290 A1 | 2/2006 | Pulito et al. | |
| 2006/0085507 A1* | 4/2006 | Zhao et al. | 709/206 |
| 2006/0129684 A1 | 6/2006 | Datta | |
| 2006/0227704 A1* | 10/2006 | Nakagawa et al. | 370/217 |
| 2006/0233106 A1* | 10/2006 | Achlioptas et al. | 370/235 |
| 2006/0251106 A1* | 11/2006 | Nakagawa et al. | 370/456 |
| 2008/0040729 A1* | 2/2008 | Garza et al. | 719/318 |
| 2008/0091779 A1* | 4/2008 | Chetuparambil et al. | 709/204 |

OTHER PUBLICATIONS

Ji, "Affinity-Based Management of Main Memory Database Clusters", ACM Transactions on Internet Technology (TOIT), vol. 2, Issue 4, Nov. 2002, pp. 307-339.

Saito et al., "Manageability, Availability, and Performance in Porcupine: A Highly Scalable, Cluster-Based Mail Service", ACM Transactions on Computer Systems, vol. 18, No. 3, Aug. 2000, pp. 298-332.

* cited by examiner

METHOD AND SYSTEM FOR HANDLING FAILOVER IN A DISTRIBUTED ENVIRONMENT THAT USES SESSION AFFINITY

BACKGROUND OF THE INVENTION

1. Field of the Invention

The present invention relates generally to an improved data processing system. More specifically, the present invention is directed to a computer implemented method, system, and computer usable program code for handling server failover in a distributed network environment that utilizes session affinity.

2. Description of the Related Art

Today, most computers are connected to some type of network. A network allows a computer to share information with other computer systems. The Internet is one example of a computer network. The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. Typically, the Internet uses a set of protocols called Transmission Control Protocol/Internet Protocol (TCP/IP).

A large number of emerging Internet applications require information dissemination across different organizational boundaries, heterogeneous platforms, and a large, dynamic population of publishers and subscribers. A publish-subscribe (pub-sub) network service is a communication infrastructure that enables information dissemination across a potentially unlimited number of publishers and subscribers. A pub-sub system is often implemented as a collection of spatially disparate nodes communicating on top of a peer-to-peer overlay network.

In such an environment, publishers publish information in the form of events and subscribers have the ability to express their interests in an event or a pattern of events by sending subscription filters to the pub-sub network. The pub-sub network uses content-based routing schemes to dynamically match each publication against all active subscriptions, and notifies the subscribers of an event if and only if the event matches their registered interest.

A converged service is an application that spans communication over multiple network protocols and protocol sessions to provide higher level function. In the case of the hypertext transfer protocol (HTTP) and session initiation protocol (SIP), a converged service joins together session information from both the HTTP and SIP protocols, allowing interactions over one protocol to influence communication over the other, subject to the constraints of the protocol. A converged service may span multiple protocol sessions from across each of these protocols.

In order to simplify structuring of code and high availability services, a mechanism called session affinity is used in conjunction with converged services. Session affinity is a mechanism in a clustered environment for associating requests within the session with a particular server within a cluster of servers. This association is accomplished via a routing mechanism that maps sessions to managing servers. When using session affinity with converged services, converged session data may live in a single application server instance within the lifetime of a session, avoiding the need for application code to perform inter-cluster communication when processing requests related to a converged session.

However, many converged applications also require accessing and manipulating common resources or data structures across multiple converged sessions. Even with session affinity, these converged sessions may be assigned to different server instances within a cluster. As a result, a method is needed for notifying all converged sessions of common information relevant to those sessions, regardless of the location of the interested sessions in the cluster. For example, consider a three-server clustered environment that includes servers A, B, and C. A subscription is set up for notifications about an application resource on server A and server C. A publish request comes in and is directed to server B. Server B does not know which server in the cluster contains the interested subscription sessions. Server B must be able to reliably broadcast the subscription data. In addition, when server B fails, it is unknown where sessions managed by server B will be reactivated within the cluster.

Therefore, it would be beneficial to have an improved computer implemented method, system, and computer usable program code for managing server failover in a pub-sub distributed network environment that utilizes session affinity.

SUMMARY OF THE INVENTION

Illustrative embodiments provide a computer implemented method, system, and computer usable program code for managing failover in a server cluster. In response to detecting a failed server in the server cluster within a distributed network, subscription message processing of a failover server is stopped. A subscription queue of the failed server is opened. A marker message is published to all subscribers of a particular messaging topic. The marker message includes an identification of the failover server that is now managing the subscription queue of the failed server. Messages within the subscription queue of the failed server are processed. It is determined if a message in the subscription queue of the failed server is the marker message. In response to determining that the message in the subscription queue of the failed server is the marker message, the subscription queue of the failed server is closed. Then, the failover server resumes processing of its original subscription queue looking for the marker message, while processing yet unseen messages from the original subscription queue. Once the marker message is found in the original subscription queue, normal operation is resumed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
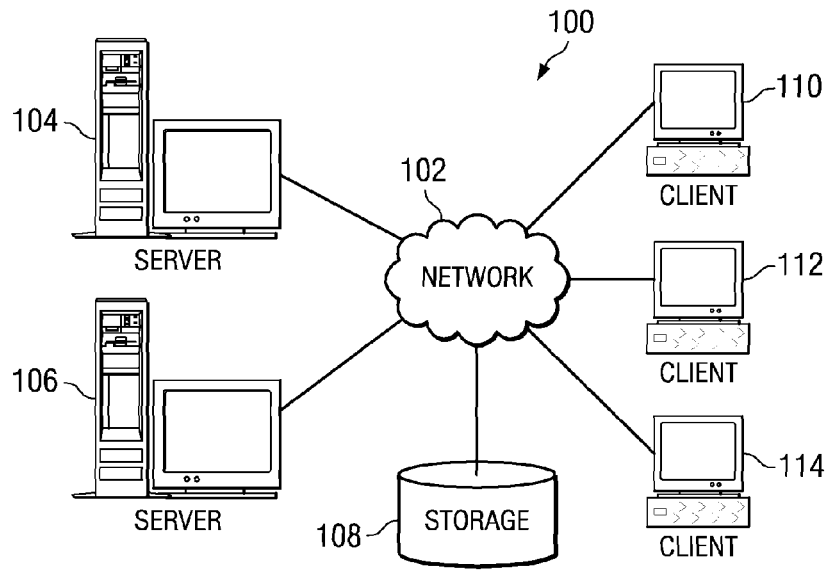
FIG. 1 is a pictorial representation of a network of data processing systems in which illustrative embodiments may be implemented.
Figure 2:
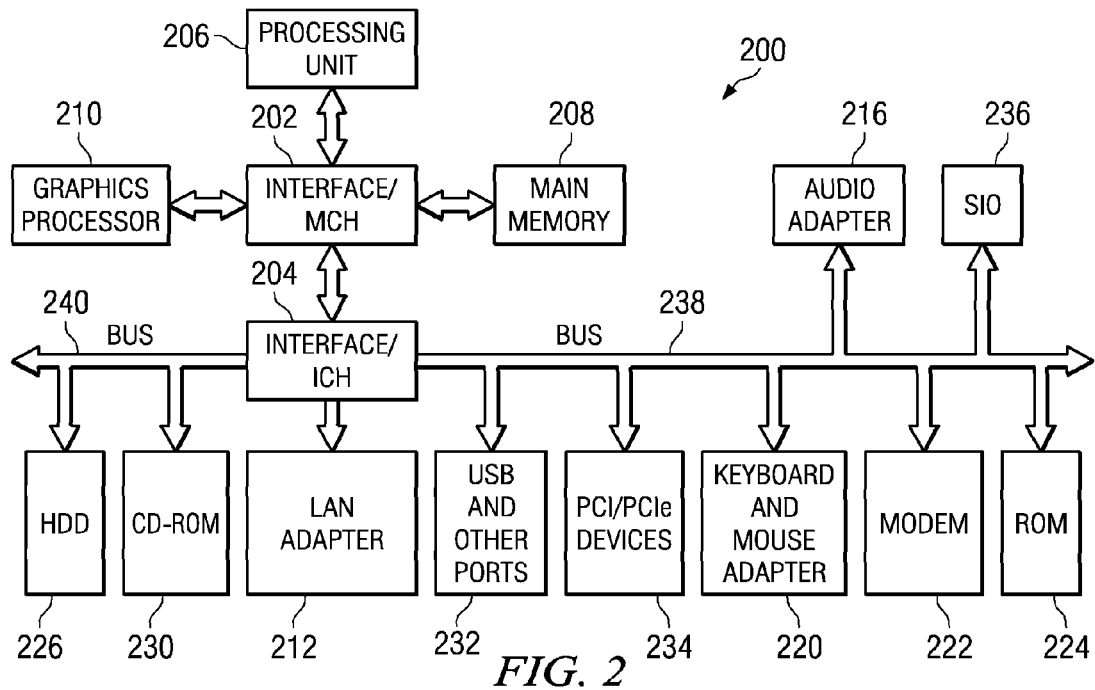
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 also connect to network 102. However, it should be noted that network data processing system 100 may include additional servers, clients, and other devices not shown. Clients 110, 112, and 114 are clients to server 104 and/or server 106. Also, clients 110, 112, and 114 may be, for example, personal computers or network computers.

In the depicted example, server 104 and server 106 are clustered servers. In addition, servers 104 and 106 provide pub-sub network services to clients 110, 112, and 114, which are subscribers. The pub-sub network supports publishing messages to a particular message topic. A topic represents a subject of interest to a plurality of subscribers. Typically, messages are assigned to a topic during the publishing process and then are received by all consumers that have subscribed to that particular topic. Zero or more subscriber clients may register interest in receiving messages on a particular message topic.

A subscription is configured so that the subscription is durable and persistent. A subscription indicates the interest of a consumer to receive some class of events. A subscription within a messaging service environment, such as, for example, Java™ Messaging Service (JMS), acts as a "virtual queue" for receiving events for a topic in the order that the events were published. Durable means that when a client stops reading messages from the subscription, the unread messages remain in the subscription queue where the client left off.

Furthermore, network data processing system 100 is a distributed network environment that utilizes session affinity. Session affinity makes use of load balancing elements to route requests that are part of the same converged session to the same application server instance. In order to address a converged session, illustrative embodiments encode a request with session information that may be used to route the request. This session information encoding may be done in two ways. One way is for the client application to obtain a session reference, such as, for example, a cookie, from a converged application. Then the client application replays that cookie in its request. Alternatively, the client application encodes the uniform resource identifier (URI) of the request so that the request is directed to the appropriate server.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface/MCH 202. Processing unit 206 may contain one or more processors and even may be implemented using one or more heterogeneous processor systems. Graphics processor 210 may be coupled to interface/MCH 202 through an accelerated graphics port (AGP), for example.

In the depicted example, local area network (LAN) adapter 212 is coupled to interface/ICH 204 and audio adapter 216, keyboard and mouse adapter 220, modem 222, read only memory (ROM) 224, universal serial bus (USB) and other ports 232, and PCI/PCIe devices 234 are coupled to interface/ICH 204 through bus 238, and hard disk drive (HDD) 226 and CD-ROM 230 are coupled to interface/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™. Microsoft and Windows Vista are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for managing failover in a server cluster within a distributed network. In response to detecting a failed server in the server cluster, a failover server stops subscription message processing of its subscription messaging queue. Then, the failover server opens a subscription queue of the failed server and publishes a marker message to all subscribers of the particular messaging topic. The marker message includes an identification of the failover server that is now managing the subscription queue of the failed server. In addition, the marker message is ignored by all other servers not participating in the failover.

In addition, the failover server processes messages within the subscription queue of the failed server. While processing messages in the failed server's subscription queue, the failover server determines if a message in the subscription queue is the marker message. In response to finding the marker message in the subscription queue of the failed server, the failover server closes the subscription queue of the failed server and resumes subscription message processing its subscription queue.

Illustrative embodiments may be implemented in a distributed pub-sub network environment. Each application server at startup generates a unique subscription identification that lives in the lifetime of the session. Each subscription is both persistent and durable. Whenever a session is created in an application server, the application server stores the unique subscription identification in a session attribute so that the session attribute is replicated as part of session state replication. When a failover occurs, the sessions of the failed server are activated on another server application.

Typically in an application server environment, such as, for example, a J2EE application server, the failover server application code is signaled of this activation via lifecycle listeners. However, it should be noted that the application code may be notified of this activation in many different ways by the platform besides via lifecycle listeners. On an activation event, the failover server application looks up the failed over subscription from the session. Then, the failover server immediately publishes a marker message to all subscriptions, which is delivered in a first in/first out (FIFO) order and also appears in the failed server's subscription queue.

The failover server then stops processing on its primary subscription and proceeds to recover from the failed over subscription, processing only messages that are associated with failed server's sessions. While recovering, failover server builds a map of messages that it has processed. Once the marker message is hit in the failed server's subscription queue, the first phase of recovery completes.

The failover server application then resumes processing the primary queue until it finds the marker message. The marker message indicates that the queues are now synchronized. While traversing the primary queue, the failover server skips over messages that are in the map so it doesn't process any messages for the recovered session. Once the failover server finds the marker message, the failover server terminates the failed over subscription and resumes normal processing. However, it should be noted that if the failed server comes up while the failover server is recovering, the failover server is not affected because the failed server generates a new unique subscription identification, thereby avoiding conflict with the failover server.

Figure 3:
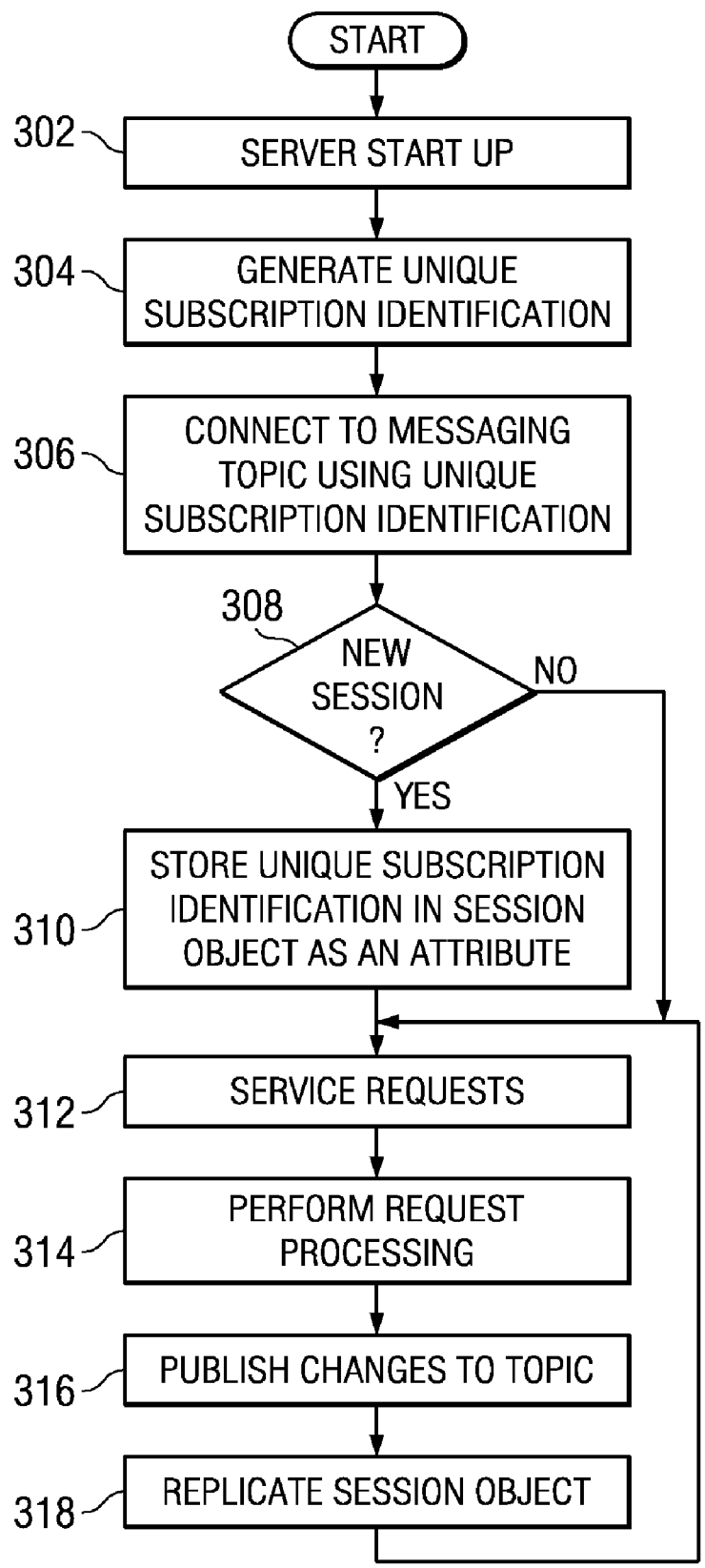
FIG. 3 is a flowchart illustrating an exemplary process for normal server operation in accordance with an illustrative embodiment.

With reference now to FIG. 3, a flowchart illustrating an exemplary process for normal server operation is shown in accordance with an illustrative embodiment. The process shown in FIG. 3 may be implemented in a server, such as, for example, server 104 in FIG. 1.

The process begins when the server starts up (step 302). After startup, the server generates a unique subscription identification that lives in the lifetime of the session (step 304). The server uses the unique subscription identification to connect to a messaging topic used for publishing notifications of changes to subscription data to subscriber clients.

Subsequent to generating the unique subscription identification in step 304, the server connects to the messaging topic using the unique subscription identification (step 306). After connecting to the messaging topic in step 306, the server makes a determination as to whether this is a new session (step 308). If this is a new session, yes output of step 308, then the server stores the unique subscription identification in a session object as an attribute (step 310). Thereafter, the process proceeds to step 312.

If this is not a new session, no output of step 308, then the server services requests (step 312). The server services requests by performing request processing (step 314). In addition, the server publishes changes to the particular subscription messaging topic (step 316). Further, the server replicates the session object for session state replication (step 318). Thereafter, the process returns to step 314 where the server continues to service requests.

Figure 4:
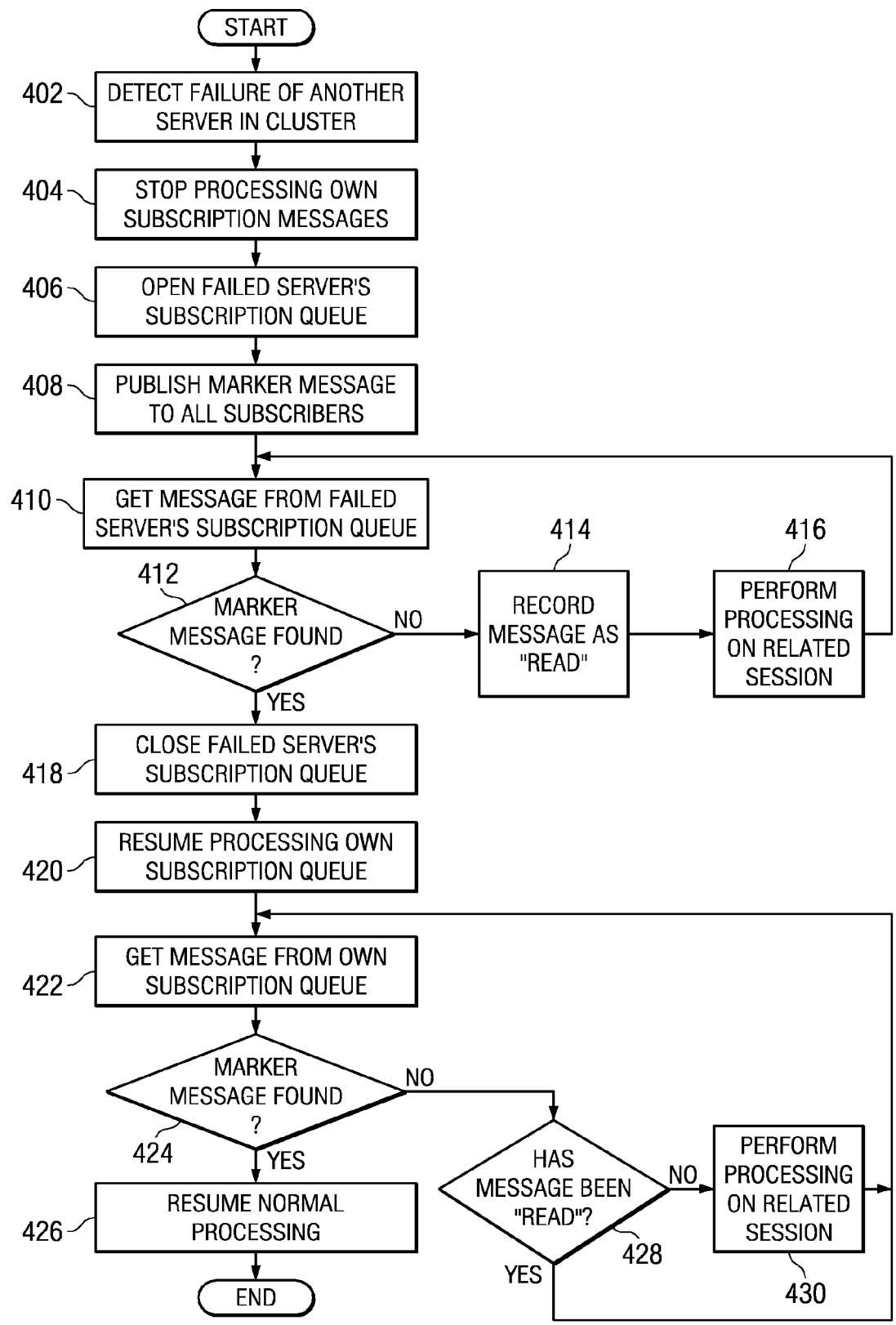
FIG. 4 is a flowchart illustrating an exemplary process for failover server operation in accordance with an illustrative embodiment.

With reference now to FIG. 4, a flowchart illustrating an exemplary process for failover server operation is shown in accordance with an illustrative embodiment. The process shown in FIG. 4 may be implemented in a server, such as, for example, server 106 in FIG. 1.

The process begins when the server detects a failure of another server within a server cluster, such as, for example, server 104 in FIG. 1 (step 402). After detecting the other server's failure in step 402, the server stops processing its own subscription messages (step 404). Then, the server opens the failed server's subscription queue (step 406). In addition, the server publishes a marker message, which includes a unique subscription identification for the server that is now providing services for the session of the failed server, to all subscribers (step 408). Also, the marker message appears in a FIFO order in both the server's and the failed server's subscription queues at the time failover occurred. The server uses this marker message to synchronize the subscription queues of both servers as described below.

Subsequently, the server gets a message from the failed server's subscription queue (step 410). Then, the server makes a determination as to whether the message is the marker message (step 412). If the message is not the marker message, no output of step 412, then the server records the message as "read" (step 414). After recording the message as seen in step 414, the server performs processing on the related session (step 416). Thereafter, the process returns to step 410 where the server gets another message from the failed server's subscription queue.

Returning now to step 412, if the message is the marker message, yes output of step 412, then the server closes the failed server's subscription queue (step 418). Afterward, the server resumes processing of its own subscription queue (step 420). Subsequent to resuming processing of its subscription queue, the server gets a message from its subscription queue (step 422). Then, the server makes a determination as to whether the message is the marker message (step 424). If the message is the marker message, yes output of step 424, then the server resumes normal processing (step 426). The process terminates thereafter.

If the message is not the marker message, no output of step 424, then the server makes a determination as to whether the message was previously read (step 428). If the message was read, yes output of step 428, then the process returns to step 422 where the server gets another message from its subscription queue. If the message was not read, no output of step 428, then the server performs processing on the related session (step 430). Thereafter, the process again returns to step 422.

Thus, illustrative embodiments provide a computer implemented method, system, and computer usable program code for handling server failover in a publish-subscribe distributed network environment that utilizes session affinity. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing failover in a server cluster, the computer implemented method comprising:

responsive to detecting a failed server in the server cluster within a distributed network, stopping, by a failover server, subscription message processing of a subscription message queue for the failover server;

opening, by the failover server, a subscription message queue of the failed server;

publishing, by the failover server, a marker message to all subscribers of a particular messaging topic that includes an identification of the failover server that is now managing the subscription message queue of the failed server and the marker message is ignored by all other servers in the server cluster, wherein the marker message appears at a same time in both the subscription message queue of the failed server and the subscription message queue for the failover server in a first-in-first-out order at a time when the failover occurred and is used to synchronize the subscription message queue of the failed server and the subscription message queue for the failover server prior to the failover server resuming normal operation after the failover;

processing, by the failover server, messages within the subscription message queue of the failed server;

determining, by the failover server, if a message in the subscription message queue of the failed server is the marker message;

responsive to determining that the message in the subscription message queue of the failed server is the marker message, closing, by the failover server, the subscription message queue of the failed server; and resuming, by the failover server, the subscription message processing of the subscription message queue for the failover server.

2. The computer implemented method of claim 1, further comprising:

responsive to determining that the message in the subscription message queue of the failed server is not the marker message, recording the message as read; and performing processing on a related subscription session for the failed server.

3. The computer implemented method of claim 1, further comprising:

determining if a message in the subscription message queue of the failover server is the marker message; and responsive to determining that the message in the subscription message queue of the failover server is the marker message, resuming the normal operation.

4. The computer implemented method of claim 3, further comprising:

responsive to determining that the message in the subscription message queue of the failover server is not the marker message, determining whether the message was previously read;

responsive to determining that the message in the subscription message queue of the failover server was previously read, getting another message from the subscription message queue of the failover server; and responsive to determining that the message in the subscription message queue of the failover server was not previously read, performing processing on a related subscription session.

5. The computer implemented method of claim 1, further comprising:

responsive to a startup of a server, generating a unique subscription identification for the server; and responsive to creating a new session, storing the unique subscription identification in the new session, wherein the unique subscription identification persists in the new session for a lifetime of the new session.

6. The computer implemented method of claim 5, wherein the unique subscription identification is used to connect with a subscription messaging topic.

7. The computer implemented method of claim 1, wherein the distributed network is a distributed publish-subscribe network that utilizes session affinity.

8. A data processing system for managing failover in a server cluster, comprising:

a bus system;

a storage device connected to the bus system, wherein the storage device includes a set of instructions; and a processing unit connected to the bus system, wherein the processing unit executes the set of instructions to stop subscription message processing of a subscription message queue for the failover server in response to detecting a failed server in the server cluster within a distributed network, open a subscription message queue of the failed server, publish a marker message to all subscribers of a particular messaging topic that includes an identification of the failover server that is now managing the subscription message queue of the failed server and the marker message is ignored ignored by all other servers in the server cluster, wherein the marker message appears at a same time in both the subscription message queue of the failed server and the subscription message queue for the failover server in a first-in-first-out order at a time when the failover occurred and is used to synchronize the subscription message queue of the failed server and the subscription message queue for the failover server prior to the failover server resuming normal operation after the failover, process messages within the subscription message queue of the failed server, determine if a message in the subscription message queue of the failed server is the marker message, close the subscription message queue of the failed server in response to determining that the message in the subscription message queue of the failed server is the marker message, and resume the subscription message processing of the subscription message queue for the failover server.

9. The data processing system of claim 8, wherein the processing unit executes a further set of instructions to record the message as read in response to determining that the message in the subscription message queue of the failed server is not the marker message and perform processing on a related subscription session for the failed server.

10. The data processing system of claim 8, wherein the processing unit executes a still further set of instructions to determine if a message in the subscription message queue of the failover server is the marker message and resume the normal operation in response to determining that the message in the subscription message queue of the failover server is the marker message.

11. A computer program product for managing failover in a server cluster, the computer program product comprising:

a computer readable storage medium having computer usable program code embodied therein, the computer usable medium comprising:

computer usable program code configured to stop subscription message processing of a subscription message queue for the failover server in response to detecting a failed server in the server cluster within a distributed network;

computer usable program code configured to open a subscription message queue of the failed server;

computer usable program code configured to publish a marker message to all subscribers of a particular messaging topic that includes an identification of the failover server that is now managing the subscription message queue of the failed server and the marker message is ignored by all other servers in the server cluster, wherein the marker message appears at a same time in both the subscription message queue of the failed server and the subscription message queue for the failover server in a first-in-first-out order at a time when the failover occurred and is used to synchronize the subscription message queue of the failed server and the subscription message queue for the failover server prior to the failover server resuming normal operation after the failover;

computer usable program code configured to process messages within the subscription message queue of the failed server;

computer usable program code configured to determine if a message in the subscription message queue of the failed server is the marker message;

computer usable program code configured to close the subscription message queue of the failed server in response to determining that the message in the subscription message queue of the failed server is the marker message; and computer usable program code configured to resume the subscription message processing of the subscription message queue for the failover server.

12. The computer program product of claim 11, further comprising:

computer usable program code configured to record the message as read in response to determining that the message in the subscription message queue of the failed server is not the marker message; and computer usable program code configured to perform processing on a related subscription session for the failed server.

13. The computer program product of claim 11, further comprising:
   computer usable program code configured to determine if a message in the subscription message queue of the failover server is the marker message; and
   computer usable program code configured to resume the normal operation in response to determining that the message in the subscription message queue of the failover server is the marker message.

14. The computer program product of claim 13, further comprising:
   computer usable program code configured to determine whether the message was previously read in response to determining that the message in the subscription message queue of the failover server is not the marker message;
   computer usable program code configured to get another message from the subscription message queue of the failover server in response to determining that the message in the subscription message queue of the failover server was previously read; and
   computer usable program code configured to perform processing on a related subscription session in response to determining that the message in the subscription message queue of the failover server was not previously read.

15. The computer program product of claim 11, further comprising:
   computer usable program code configured to generate a unique subscription identification for a server in response to a startup of the server; and
   computer usable program code configured to store the unique subscription identification in a new session in response to creating the new session, wherein the unique subscription identification persists in the new session for a lifetime of the new session.

16. The computer program product of claim 15, wherein the unique subscription identification is used to connect with a subscription messaging topic.

17. The computer program product of claim 11, wherein the distributed network is a distributed publish-subscribe network that utilizes session affinity.

* * * * *